Patented May 29, 1951

2,555,049

UNITED STATES PATENT OFFICE 2,555,049

PRODUCTION OF AQUEOUS SOLUTIONS OF POLYVINYL ACETATE DERIVATIVES

Ralph Robert Lyne, West Kilbride, Scotland, assignor to Imperial Chemical Industries Limited, a corporation of Great Britain No Drawing. Application September 30, 1946, Serial No. 700,345. In Great Britain November 14, 1945

8 Claims. (Cl. 260—29.6)

The present invention relates to the production of aqueous solutions of polyvinyl ester derivatives and is particularly concerned with a method for the production of an aqueous solution of an alkali metal salt of an acid ester of a partially esterified alcohol in which the vinyl alcohol groups are partly esterified by one or more poly-basic acids as herein defined and partly acetylated and partly unreplaced.

U. K. Specification No. 552,011 for instance discloses inter alia that particularly useful water soluble dispersing agents for coating compositions of the kind therein described are provided by water soluble salts formed between an alkali metal on the one hand, and on the other hand, a polyvinyl ester of a polycarboxylic acid, the said acid being only partially esterified so that it contains a free carboxylic group for the desired salt formation. These water soluble salts are referred to thereinafter as polyvinyl ester-salts. The polycarboxylic acid may for example be phthalic acid or an aliphatic polycarboxylic acid. The polyvinyl ester-salt may contain also ester groups derived from a monocarboxylic acid. The base of which the polyvinyl ester-salt is a salt, may for example be sodium, potassium, ammonium or mono-, tri-, di- or tetra-methyl ammonium hydroxide. Several methods are described therein for the preparation of the said water soluble dispersing agents and it is stated that the salts of polyvinyl carboxylic-esters prepared are coagulated or precipitated from their solution in water by small concentrations of water-soluble electrolytes, for instance by saturation with calcium sulphate or in presence of a concentration of sodium chloride, sodium phthalate or sodium acetate somewhat less than 0.1 parts per 100 parts water, or when the pH of the solution has been brought below 5 by means of acids or above 10 by means of alkali.

The object of the present invention is to provide a method for the production of aqueous solutions of polyvinyl ester derivatives of greatly improved stability especially in the presence of water soluble electrolytes. For example, it has been found that it is possible to produce aqueous emulsions of a mineral oil, including as emulsifying agents some of the aqueous solutions of polyvinyl ester derivatives prepared according to the method of the present invention, sufficiently stable to be unaffected by the presence of nickel nitrate, and to remain unaffected after six months storage in the presence of the nickel nitrate.

According to the present invention the method for the production of an aqueous solution of an alkali metal salt of an acid ester of a partially esterified polyvinyl alcohol in which the vinyl alcohol groups are partly esterified by one or more polybasic acids as hereinafter defined and partly acetylated and partly unreplaced comprises heating polyvinyl acetate and the one or more polybasic acids in such relative proportions and to a temperature and for a period of time at least sufficient to form a partially thickened alkali soluble mass, washing the thickened mass thus formed until free from excess acid, adding an alkali until the pH is adjusted to 7, diluting the resulting concentrated solution and adding caustic alkali in such amount that the required degree of hydrolysis is obtained.

Preferably the said hydrolysis is carried out to such a degree that the vinyl alcohol content of the resulting alkali metal salt of the acid ester of the partially esterified polyvinyl alcohol is in excess of 9%.

By a polybasic acid is to be understood these organic acids which contain an alpha beta dicarboxylic acid group and not more than one hydroxyl group and which if unsaturated have the cis formation. Examples of such acids are succinic, citric, malic, maleic and phthalic acid. Unsuitable acids are for example oxalic, adipic, sebasic, lactic and fumaric acid.

In such cases where more than one polybasic acid is used it is preferable to heat the polyvinyl acetate first with the slower reacting polybasic acid before the addition of the more reactive acid or acids.

A preferred method for the production for example of an aqueous solution of an alkali metal salt of an acid ester of a partially esterified polyvinyl alcohol in which the vinyl alcohol groups are partly phthalated and partly acetylated and partly unreplaced comprises heating polyvinyl acetate and phthalic acid to about 150° C. for a period of time at least sufficient to form a partially thickened alkali soluble mass, washing the thickened mass thus formed until free from excess acid, adding an alkali until the pH is adjusted to 7, diluting the resulting concentrated resin solution and adding caustic soda so that there are 13 grams thereof per 100 grams of resin and the solids content of the resin solution is 15% and thereupon permitting the solution to mature for at least an hour.

A suitable ratio of the polyvinyl acetate to the phthalic acid is four to three respectively. If desired the phthalic acid can be replaced by molecularly equivalent quantities of the aforementioned other suitable acids.

It is sometimes desirable to use the polybasic anhydride and water instead of the polybasic acid, as for example, in the production of maleic acid derivatives it is more convenient to heat a mixture of polyvinyl acetate, maleic anhydride and water instead of polyvinyl acetate and maleic acid. The presence of the hot water however brings about some hydrolysis of the polyvinyl acetate maleate formed and so less caustic alkali is required to attain the desired final degree of hydrolysis of the resin.

It is to be appreciated that according to the present invention the said polyvinyl ester derivatives can be prepared of varying composition, that is to say, for example if we are concerned with the preparation of aqueous solutions of phthalate acetate alcohol derivatives of polyvinyl alcohol we can alter the composition of the final compound according to the relative proportions of the polyvinyl acetate and phthalic acid used and the degree of the final hydrolysis by caustic alkali. The composition of say polyvinyl phthalate acetate can be analysed and expressed in terms of monovinyl phthalate, vinyl acetate and vinyl alcohol and from the following table showing the stability of two emulsions of definite compositions when prepared with the polyvinyl phthalate acetate of differing compositions it will be seen that a good emulsifying agent is produced if the vinyl alcohol content of the resin is in excess of 9%.

*Table*

| NaOH gm./100 gm. Resin | Analysis of polyvinyl phthalate acetate in terms of— | | | Emulsion stability | |
|---|---|---|---|---|---|
| | Vinyl phthalate, Per Cent | Vinyl Acetate, Per Cent | Vinyl alcohol, Per Cent | Emulsion No. 1 | Emulsion No. 2 |
| 0 | 30.3 | 65.2 | 4.5 | 0 | 1 day. |
| 5 | 30.3 | 66.5 | 3.2 | 1 day | 20 days. |
| 7.5 | 30.3 | 60.7 | 9.0 | 1 month | 6 months. |
| 10 | 29.9 | 57.0 | 13.1 | over 6 months | 6 months. |
| 15 | 32.1 | 48.7 | 19.2 | over 6 months | 6 months. |
| 20 | 32.0 | 42.7 | 25.3 | over 6 months | 6 months. |
| 25 | 31.2 | 39.3 | 29.3 | over 6 months | 6 months. |
| 30 | 31.2 | 28.1 | 40.7 | over 6 months | 6 months. |
| 50 | 1.9 | 1.3 | 96.8 | 1 day | 0. |

Emulsion No. 1 is prepared from Brunswick green and nitrocellulose linseed oil leather dope in the following manner. The lacquer phase is made up as follows:

Parts by weight
Nitrocellulose (of 12% nitrogen content and such that 20 grams per 100 ccs. of aqueous acetone of 95 ccs. pure acetone and 5 ccs. distilled water has a viscosity of 30 c. g. s. units at 20° C. _____ 7.7
Mid Brunswick green _____ 6.8
Blown linseed oil _____ 20.1
Blown castor oil _____ 5.1
Castor oil _____ 2.3
Butyl alcohol _____ 3.4
Butyl acetate _____ 21.9
Ethyl acetate _____ 10.0
Toluene _____ 12.6
Methyl cycle hexanone _____ 10.1

The aqueous phase is made up to have the following composition:

Parts by weight
Polyvinyl acetate phthalate partially hydrolised resin made according to the invention _____ 3
Water _____ 97

Emulsion 1 is prepared by the emulsification of the lacquer phase with the water phase in the ratio of three to one by weight.

Emulsion No. 2 is an emulsion of a straight green pigmented nitrocellulose lacquer prepared in the following manner.

The lacquer phase is as follows:

Parts by weight
Nitrocellulose (of 11.5% nitrogen content and such that 20 grams per 100 ccs. of aqueous acetone of 95 ccs. pure acetone and 5 ccs. distilled water has a viscosity of 30 c. g. s. units at 20° C. _____ 10.2
Mid Brunswick green _____ 8.9
Blown linseed oil _____ 1.5
Castor oil _____ 3.0
Butyl alcohol _____ 4.8
Ethyl acetate _____ 12.9
Butyl acetate _____ 28.7
Methyl cyclo hexanone _____ 13.3
Toluene _____ 16.7

The aqueous phase is made up to have the following compositions:

Parts by weight
Polyvinyl acetate phthalate partially hydrolysed resin made according to the invention _____ 3
Water _____ 97

Emulsion 2 is prepared by emulsification of the lacquer phase with the water phase in the ratio of three to one by weight.

From various considerations such as compatibility tests with nitrocellulose and interfacial experiments a preferred composition is monovinyl phthalate 30 parts, vinyl acetate 50 parts, vinyl alcohol 20 parts but these figures may vary between wide limits.

The invention is illustrated by the following examples, wherein the parts and percentages mentioned are by weight unless otherwise indicated.

*Example 1*

4 parts polyvinyl acetate (molecular weight about 11,000 to 12,000) and 3 parts phthalic acid are heated to about 150° C. in a suitable mixer until such time as the mass shows definite signs of thickening. This generally requires about 7 hours. Water is then added to the hot mass, the temperature reduced to about 90° C., and the resin washed until free from excess acid. Soda ash is added, the temperature not being allowed to rise above 50° to 60° C. and the pH adjusted to 7.

The dilution of the resin is then carried out in a suitable mixer and caustic soda solution added in the cold so that at the end of the addition the amount of sodium hydroxide is 13 grams per 100 grams resin and the solid content of the resin solution is 15%. After standing for at least one hour the solution of the resin is ready for use.

Example 2

12 parts of polyvinyl acetate (molecular weight about 11,000 to 12,000) are mixed with 5.5 parts maleic anhydride and 1 part of water. The temperature is raised to 150° C. and stirring is continued for about 2 hours when the mass shows definite signs of thickening. The procedure is the same as in Example 1 except that only 7.5 grams of caustic soda per 100 grams of dry resin is used for hydrolysis.

Example 3

The phthalic acid in Example 1 is replaced by phthalic anhydride and water. Otherwise the procedure is the same, except that, in order to obtain standard products, the resin is analysed before hydrolysis so as to ascertain the quantity of caustic soda which has to be added to give hydrolysed products of approximately 15 to 20% vinyl alcohol content.

Example 4

12 parts polyvinyl acetate (molecular weight about 11,000 to 12,000) and 7.1 parts citric acid are heated to 150° C. and the procedure adopted is similar to Example 1 except that 15 grams caustic soda are added per 100 grams of dry resin.

Example 5

12 parts of polyvinyl acetate (molecular weight about 11,000 to 12,000) and 6 parts phthalic acid are heated to about 150° C. in a suitable mixer for about 3 hours. 6 parts of citric acid are then added and the heating continued for another 4 hours. Water is then added to the hot mass and the procedure from here onwards is the same as in Example 1.

I claim:

1. A method for the production of an aqueous solution of an alkali metal salt of an acid ester of a partially esterified polyvinyl alcohol in which the vinyl alcohol groups are partly esterified by a polybasic acid, partly acetylated, and partly unreplaced, which comprises heating an excess of polyvinyl acetate with a member of the group consisting of polybasic acids and polybasic anhydrides and water to form a partially thickened, alkali-soluble mass, removing the excess acid from the thickened mass, adjusting the pH to 7, diluting the concentrated resin thus formed, and hydrolyzing the resin with caustic alkali.

2. The method of claim 1 in which the hydrolysis is continued until the polyvinyl alcohol content of the resin is in excess of 9%.

3. The method of claim 1 in which the hydrolysis is accomplished by adding 13 grams of caustic soda per 100 grams of resin.

4. The method of claim 1 in which the polyvinyl acetate and the polybasic acid are heated to about 150° C.

5. The method of claim 1 in which 4 parts of polyvinyl acetate are heated with 3 parts of polybasic acid.

6. The method of claim 1 in which the polybasic acid is introduced as a polybasic anhydride and water.

7. The method of claim 1 in which the polybasic acid is phthalic acid.

8. The method of claim 1 in which the polybasic acid is maleic acid.

RALPH ROBERT LYNE.

REFERENCES CITED

The following references are of record in the file of this patent:

UNITED STATES PATENTS

| Number | Name | Date |
| --- | --- | --- |
| 2,275,685 | Salo | Mar. 10, 1942 |
| 2,379,309 | Malm et al. | June 26, 1945 |

FOREIGN PATENTS

| Number | Country | Date |
| --- | --- | --- |
| 552,011 | Great Britain | Mar. 19, 1943 |

OTHER REFERENCES

Mason et al. "The Technology of Plastics and Resins," September 1945 (page 296).